US011322939B1

(12) United States Patent
Spano, Sr. et al.

(10) Patent No.: US 11,322,939 B1
(45) Date of Patent: May 3, 2022

(54) POWER QUALITY IMPROVEMENT SYSTEM WITH AUTOMATIC POWER FACTOR CORRECTION AND HARMONIC FILTERING

(71) Applicant: Royal Power Energy Inc., Garfield, NJ (US)

(72) Inventors: Frank J. Spano, Sr., Monroe, NJ (US); Richard A. Sweatt, Morgan Hill, CA (US); Daniel Simon, Whitestone, NY (US)

(73) Assignee: Royal Power Energy Inc., Garfield, NJ (US)

( * ) Notice: Subject to any disclaimer, the term of this patent is extended or adjusted under 35 U.S.C. 154(b) by 0 days.

(21) Appl. No.: 16/991,841

(22) Filed: Aug. 12, 2020

(51) Int. Cl.
*H02M 1/12* (2006.01)
*H02J 3/01* (2006.01)
*H02J 3/18* (2006.01)

(52) U.S. Cl.
CPC . *H02J 3/01* (2013.01); *H02J 3/18* (2013.01)

(58) Field of Classification Search
CPC ...................................... H02J 3/01; H02J 3/18
USPC ......................................................... 307/105
See application file for complete search history.

(56) References Cited

U.S. PATENT DOCUMENTS

| 3,859,542 | A |   | 1/1975 | Kennedy |           |
|-----------|---|---|--------|---------|-----------|
| 4,891,569 | A | * | 1/1990 | Light   | H02J 3/1828 |
|           |   |   |        |         | 323/210   |
| 6,462,519 | B1 |  | 10/2002 | McDaniel et al. | |
| 8,076,910 | B2 |  | 12/2011 | Bickel | |
| 2012/0016530 | A1 | | 1/2012 | Mazzoli | |

(Continued)

FOREIGN PATENT DOCUMENTS

| CN | 108765747 | 11/2018 |
| JP | 3289326   | 12/1991 |
| JP | 5846141   | 1/2016  |

(Continued)

OTHER PUBLICATIONS

Eaton, "Power Factor Capacitors and Detuned Filters," Sheet 35001, CA08104001E, pp. 70 (Dec. 2015) <www.eaton.com/consultants>.

*Primary Examiner* — Toan T Vu
*Assistant Examiner* — Dru Parries
(74) *Attorney, Agent, or Firm* — Dicke, Billig & Czaja, PLLC (57) ABSTRACT

One example provides a power quality improvement system for an electrical power distribution system including a parameter measurement module to measure a power factor of the electrical power distribution system, a number of capacitor steps selectively connectable to the electrical power distribution system, and a number of harmonic filters connected to the electrical power distribution system, wherein a number and size of each capacitor step and a type of the harmonic filters are based on a load profile of the electrical power distribution system. A controller monitors a status of the harmonic filters and automatically connects or disconnects selected capacitor steps from the electrical power distribution to maintain the measured power factor at a set-point power factor, where a delay before connecting or disconnecting each selected capacitor step is based on a load stability factor of the electrical power distribution system, the load stability factor based on the load profile.

19 Claims, 6 Drawing Sheets

(56) References Cited

U.S. PATENT DOCUMENTS

2019/0370693 A1  12/2019  Franklin, Jr. et al.

FOREIGN PATENT DOCUMENTS

| KR | 19990017466 | 5/1999 |
| KR | 200383034 | 4/2005 |
| KR | 101678964 | 11/2016 |
| WO | 2004082095 | 9/2004 |

* cited by examiner

POWER QUALITY IMPROVEMENT SYSTEM WITH AUTOMATIC POWER FACTOR CORRECTION AND HARMONIC FILTERING

BACKGROUND

Poor power quality, such as low system power factor (pf) and high levels of harmonic currents, can adversely impact facility electrical power distribution systems and equipment and increase utility service costs.

SUMMARY

One example provides a power quality improvement system for an electrical power distribution system. The power quality improvement system includes a monitor module to provide real time measurements of a power factor of the electrical power distribution system, a number of capacitor steps selectively connectable to the electrical power distribution system, and a number of harmonic filters connected to the electrical power distribution system, wherein a number and size of each capacitor step and a type of the harmonic filters are based on a load profile of the electrical power distribution system. The power quality improvement system further includes a controller to monitor a status of the harmonic filters, and to automatically connect or disconnect a number of selected capacitor steps from the electrical power distribution to maintain the power factor at a set-point power factors, wherein a switching time delay before connecting or disconnecting each selected capacitor step is based on a load stability factor of the electrical power distribution system, and wherein the load stability factor is based on the load profile. In some examples, the power quality improvement system includes a power quality node to provide real-time monitoring of system power quality.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Power quality is critical to the effective operation of a facility's electrical power distribution system and equipment powered thereby. Poor power quality, such as low system power factor (PF) and high levels of harmonic currents, for example, can have adverse impacts on a power distribution system such as by reducing system efficiency, causing overheating of power distribution equipment and other facility equipment powered therefrom, and increasing utility service costs, to name a few.

Power factor is a measure of how effectively an electrical power distribution system consumes electricity to produce real or useful work. The higher the power factor (i.e., the closer the power factor is to unity), the more useful work which is produced for a given supply voltage and current. A power distribution system is most efficient when loads connected thereto are purely resistive loads (e.g., incandescent lights and electric heating elements). With resistive loads, voltage and current waveforms are in phase with one another such that all power is used to produce real work. Such power is referred to as real power and is measured in kilowatts (kW).

However, in addition to resistive loads, electrical power distribution systems nearly universally supply power to reactive loads (e.g., inductive motors, transformers florescent lights). Reactive loads temporarily store and release electrical energy in the form of magnetic and electrical fields required for equipment operation during each alternating current (AC) cycle. The voltage and current waveforms of reactive loads are out of phase with one another, where the power used to produce magnetic fields for equipment operation does not produce real work. Such power is referred to as reactive power and is measured in kilovolt amperes reactive (kVAR).

Figure 1A:
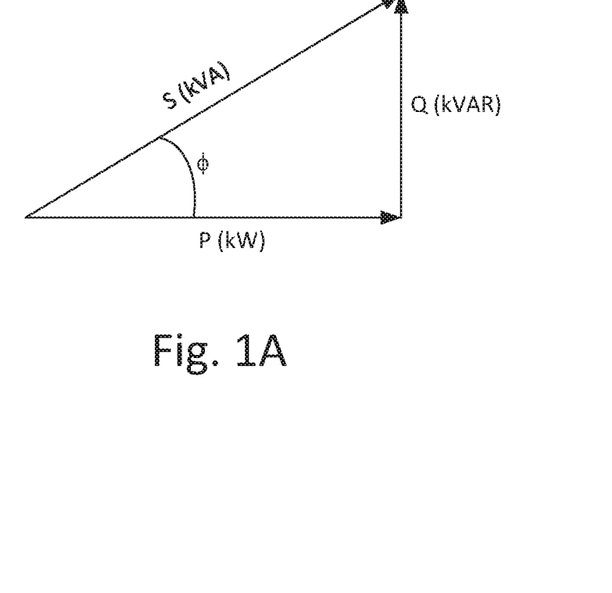
FIG. 1A generally shows a power triangle illustrating power factor.

FIG. 1A illustrates what is typically referred to as the power triangle, and shows that apparent power (S), as measured in kilovolt amperes (kVA), is the vector sum of real power (P) and reactive power (Q). Apparent power (S) represents the total amount of power required to produce the corresponding amount of real power (P). Power factor (PF) is the ratio of real power (P) to apparent power (S), such that PF=S/P=cos φ. For a completely resistive load, the power factor would be "1", or unity (i.e., real power, P, is equal to apparent power, S). For loads including reactive loads (e.g., inductive motors), the power factor is less than "1", with inductive loads resulting in a lagging power factor (where the current waveform lags the voltage waveform, and capacitive loads resulting in a leading, or "negative" power factor (i.e., cos–$\phi$, where the current waveform leads the voltage waveform).

Loads on a facility electrical power distribution systems are almost universally net inductive, meaning that, unless compensated for (as will be described in greater detail below), the system power factor is nearly always positive and less than unity. However, a system power factor which is too low, such as below 0.9, for example, is undesirable for many reasons. First, the lower the power factor, the higher the system current level required to produce a given amount of real power (kW). Higher current levels result in higher distribution system power losses, larger voltage drops, loss of system capacity, and heating of equipment (which may shorten equipment life cycle), to name a few.

Additionally, a low system power factor can significantly increase utility costs. For a given billing period, utilities typically charge customers for supplied energy in kilowatt-hours plus a "demand charge", where the demand charge is based upon the peak apparent power (kVA) during the billing period. Some utilities may also apply a power factor penalty charge if the power factor during the peak period (e.g., during a 15-minute sliding window) is below a required set point (such as 0.9 or 0.95, for example). Such increased utility costs can be significant.

In addition to resistive and reactive loads, which are sometimes referred to as linear loads (i.e., resistive, inductive, and capacitive loads where voltage and current waveforms are purely sinusoidal), non-linear loads are increasingly prevalent on facility electrical power distribution systems. Non-linear loads primarily take the form of rectifiers used to convert AC power to DC power in power electronic equipment, such as computers, variable speed drives, electrical chargers, and compact fluorescent and LED lighting, for example. Non-linear loads draw current in a non-sinusoidal fashion at frequencies which are multiples of the fundamental frequency of the system (e.g., 60 Hz), which are referred to as harmonic currents (e.g., $5^{th}$, $7^{th}$, $9^{th}$, etc.). Rather than shifting the current waveform like reactive loads, harmonic currents introduced by non-linear loads distort the current waveform. Harmonic currents increase rms current levels and deteriorate the supply voltage quality of electrical power distribution systems, which can lead to overheating of transformers, motors, and cables, thereby adversely impact equipment life cycles, and to increased losses and reduced system capacity. Harmonic currents can also disrupt the operation of control equipment (e.g., voltage regulators) due to the introduction of zero crossing noise.

To improve system power factor, power factor correction systems have been developed to add and subtract capacitance to regulate the power factor of a distribution system. With reference to FIG. 1, when apparent power (S) is greater than real (working) power (P), the utility must supply the reactive power (Q), which is typically for inductive loads. Power factor correction capacitors serve as reactive power generators to reduce the reactive power load (Q) required by inductive loads on the system, thereby increasing the system power factor and reducing the apparent power (S).

Figure 1B:
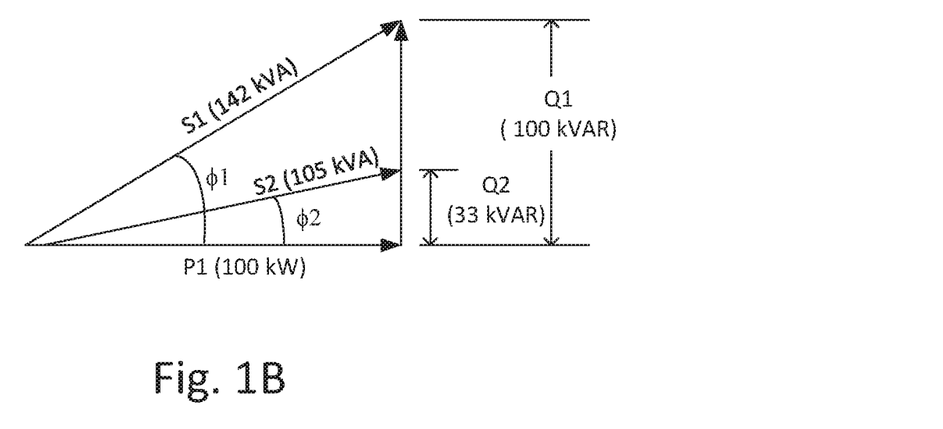
FIG. 1B generally shows a power triangle illustrating power factor adjustment.

For example, FIG. 1B illustrates a distribution system initially having a real power load (P1) of 100 kW, and a reactive power load (Q1) of 100 kVAR, such that the apparent power load (S1) is 142 kVA with a system power factor of 0.7 (or 70%). After installing power factor correction capacitors of 67 kVAR to correct the system power factor to 0.95, or 95%, the distribution system has a corrected reactive power load (Q2) of 33 kVAR, and a corrected apparent power load (S2) of 105 kVA. As such, the addition of 67 kVAR of power factor correction capacitors corrected the power factor to 95% and reduced apparent power by 35%.

Likewise, harmonic filtering systems have been developed to limit or remove harmonic currents from electrical distribution systems in cases where high levels of harmonic distortion are present. Passive harmonic filters act as low-impedance paths at designed frequencies, such as at frequencies corresponding the system harmonics which are desired to be removed (e.g., $5^{th}$, $7^{th}$, $11^{th}$, and so on) so as to shunt such harmonics from the system, such as to ground, for example. As opposed to shunting harmonic currents from a power distribution system, active harmonic filters dynamically generate current waveforms counter to detected harmonic current waveforms to effectively cancel the harmonic currents from the system.

While power factor correction systems and harmonic filtering systems are effective at improving system power quality, such systems are often implemented independently of one another. However, depending on characteristics of the electrical power distribution system, there can be undesirable interaction between power factor correction capacitors and system harmonics which, if not accounted for, can cause damage to distribution system components and equipment (e.g., transformers, motors), as well as to the power factor correction system itself. For example, if not accounted for, power factor correction capacitors may interact with the inductance of the service transformer to form a resonant circuit to magnify harmonic currents and voltages to levels resulting in damage to equipment (as described above), and, since impedance of a capacitor is inversely proportional to frequency, the power factor correction capacitors themselves may be damaged by higher order harmonics, if present. Additionally, harmonic currents themselves can adversely impact system power factor.

Figure 2:
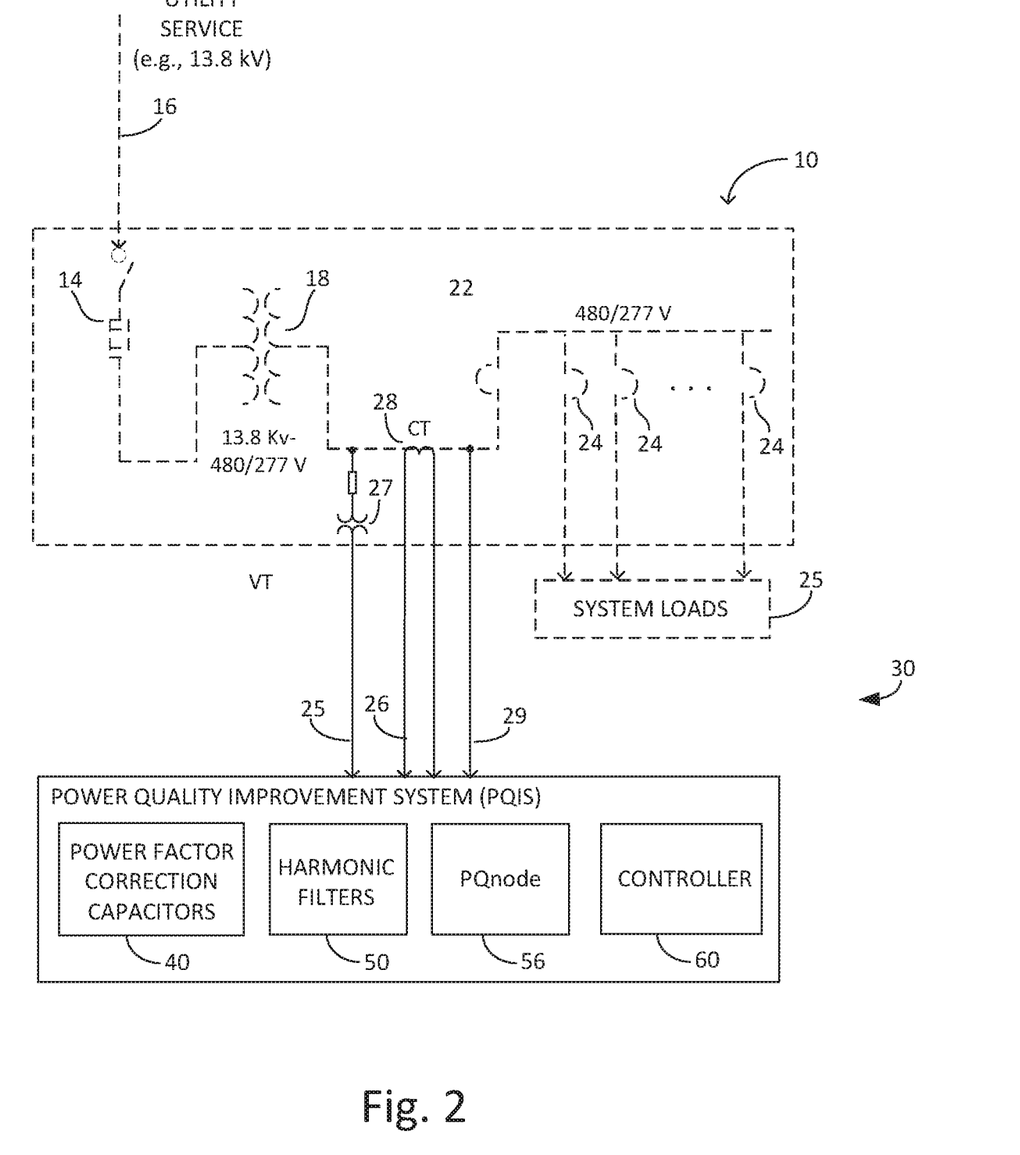
FIG. 2 is a block and schematic diagram generally illustrating a power quality improvement system for an electrical distribution system, according to one example.

FIG. 2 is a block and schematic diagram generally illustrating a power quality improvement system (PQIS) 30 for connection to a facility electrical power distribution system 10 which, in accordance with the present disclosure, integrates a power factor correction system with a harmonic filtering system. PQIS 30 includes power factor correction capacitors 40 and harmonic filters 50 and a power quality node (PQ node) 56 (for monitoring system power quality). According to the present disclosure, power factor correction capacitors 40 and harmonic filters 50 are configured and implemented in conjunction with one another based on a system load profile of an electrical power distribution system to which PQIS is connected, such as facility electrical power distribution system 10. In examples, as will be described in greater detail below, such system load profile is derived from metering (e.g., Dranetz metering) of the electrical power distribution system 10 over an extended time period (e.g., a 2 week time period).

As will be described in greater detail below, PQIS 30 includes a controller 60 to automatically and dynamically monitor and control/regulate system power factor (e.g., maintains a system power factor at a selected set-point power factor) and harmonic distortion (e.g., reduce or eliminate undesirable harmonic currents) via dynamic control of power factor correction capacitors 40 and harmonic filters 50 to provide the ideal combination of power factor correction capacitors 40 and harmonic filters 50 to optimize the power quality of electrical power distribution system 10. As will also be described in greater detail below, in examples, PQIS 30 further monitors and balances loading between individual capacitor banks of power factor correction capacitors 40 over time to avoid potential thermal overloading and extend the operational life of such capacitor banks and of PQIS 30 as a whole.

In one example, facility electrical power distribution system 10 is generally illustrated as including switchgear 12 having a primary switch 14 serving as a connection point to an incoming utility service 16. Utility service 16 is illustrated as being a 13.8 kV service, for example, but may be any suitable voltage level. As illustrated, facility electrical power distribution system 10 includes a 13.8 kV-480/277 V stepdown transformer 18 which feeds secondary switchgear 20 via a secondary main circuit breaker 22, with secondary switchgear 20 including a number of circuit breakers 24 feeding facility loads 25 (e.g., induction motors, lighting, computer equipment, HVAC equipment, etc.). In other examples, electrical power distribution system 10 may receive utility service at other voltage levels, such as secondary voltage levels (e.g., 480/277 V). It is noted that electrical power distribution system 10 is shown for illustrative purposes, and that PQIS 30 may be implemented with electrical distribution systems having any number of different voltage levels and configurations.

In one example, as illustrated, PQIS 30 is connected to electrical power distribution system 10 via an electrical connection 29 with switchgear 20. In one example, PQIS 30 is connected upstream of main circuit breaker 22. In other examples, PQIS 30 may be connected to electrical power distribution 10 at other locations. In examples, PQIS 30 respectively receives voltage and current signals representative of the electrical loads on distribution system 10 via signal paths 25 and 26 from voltage and current transformers 27 and 28. It is noted that the configuration of FIG. 2 represents only one example of how PQIS 30 may be connected to an electrical power distribution system, such as electrical power distribution system 10. It is noted that PQIS 30 may be connected to electrical power distribution systems having any number of different configurations and voltages.

Figure 3:
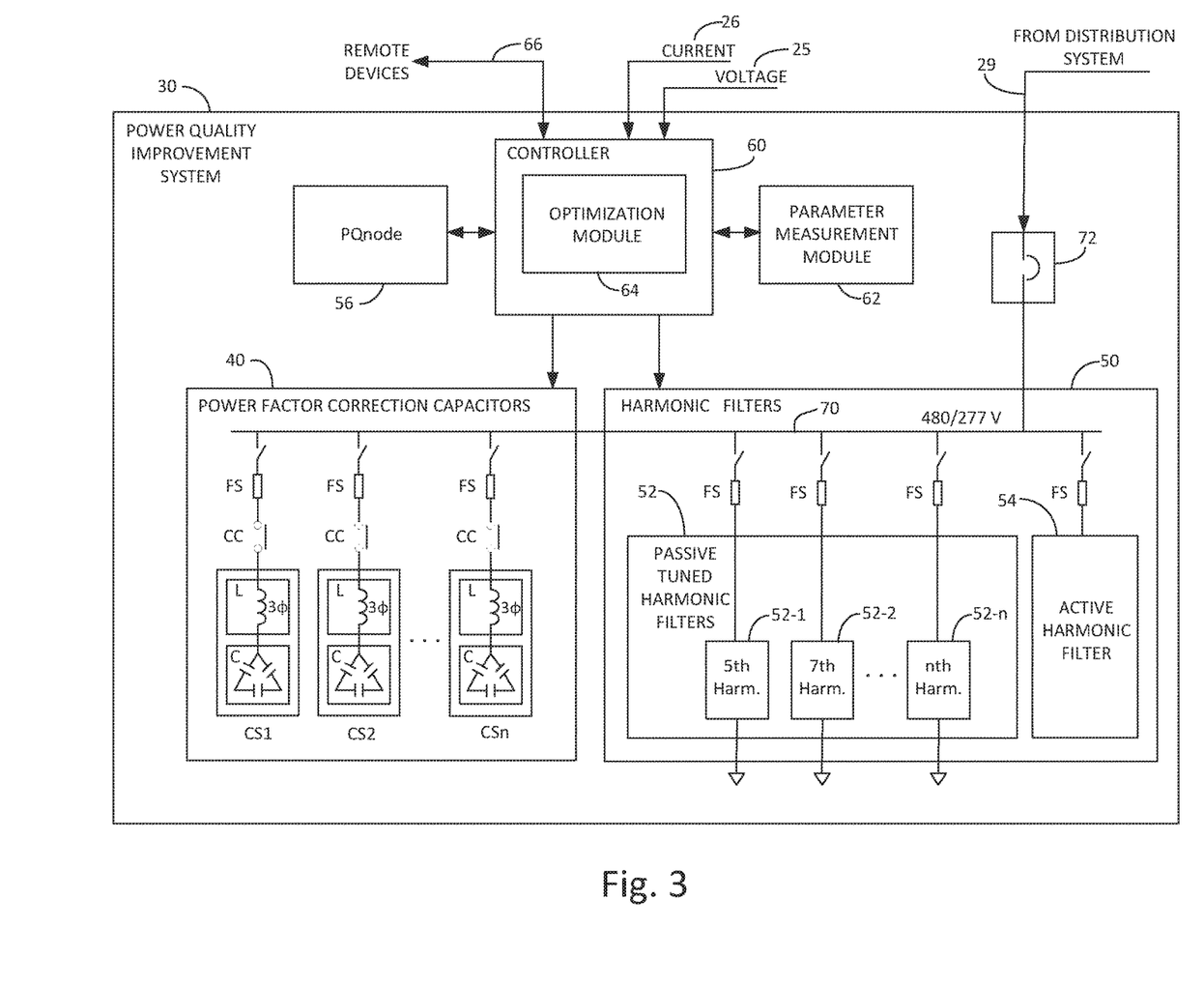
FIG. 3 is a block and schematic diagram generally illustrating a power quality improvement system for an electrical distribution system, according to one example.

FIG. 3 is a block and schematic diagram generally illustrating PQIS 30, according to one example, where controller 60 includes a parameter measurement module 62 and an optimization module 64. In one example, controller 30 receives voltage and current signals representative of system loads on electrical power distribution system 10 via signal lines 25 and 26, and communicates (e.g., via Internet communications) with remote devices (e.g., remote control and monitoring equipment), as indicated at 66.

As described above, in one example, to configure power factor correction capacitors 50 and harmonic filters for a given electrical power distribution system, such as electrical power distribution system 10, the electrical power distribution system is metered for an extended time period (e.g., 2 weeks). In one example, a metering system, such as Dranetz metering system is employed to perform such system metering. A wide variety of load parameters and characteristics of power distribution system 10 are measured over time, such as kilowatt-hours (kWH), real power (kW), reactive power (kVAR), and apparent power (kVA), as well as any harmonic currents that may be present at a number of different frequencies. Such metering measures a wide variety of load characteristics such as, for example, changes in real power, reactive power, and apparent power, and power factor over time (e.g., 15 minute intervals), peak loads and when such peak loads occur (real, reactive, and apparent power), system power factor over time, and the frequency, peak magnitudes, and changes in magnitude of any system harmonics over selected time intervals.

In one example, a load profile of electrical power distribution system 10 is derived from such measured system parameters and characteristics. From the load profile, various system parameters for the configuration and operation of PQIS 30 are determined, such as an amount of power factor correction capacitance (kVARs) required to maintain the system power factor at a selected set-point power factor at all times, the peak magnitudes of any harmonic currents present on the electrical distribution system, and a stability of the system load (e.g., how frequently and over what magnitude range does the load vary over time). A "stable" load is considered to be relatively steady over time (i.e., variations in the real, reactive, and apparent power, power factor, and any harmonic currents are relatively small over a given time period, such as over a 24 hour period, for example). Conversely, a "variable" load, is considered to less stable, where such values may change frequently and over large magnitude ranges in a given time period (e.g., a 24 hour period). In examples, as will be described in greater detail below, based on analysis of the load profile, the stability of the electrical distribution system load is characterized in the form of a "load stability factor" which is assigned to the system load, and which is used to configure components (e.g., power factor correction capacitors 40) and operating parameters of PQIS 30 to make certain operating decisions. In one example, the greater the load stability factor, the more stable the load.

As described above, based on the system load profile, a largest amount of capacitance is determined which is required to correct the system power factor to a desired design level (e.g., above 95%). In one example, to enable PQIS 30 to adapt to load changes that may occur over time on electrical power distribution system 10, power factor control capacitors 40 have a total installed capacitance in excess of the largest amount indicated by the load profile, such as 20% more, for example. For example, in a case where 500 kVAR of power factor correction capacitance is needed to maintain the system power factor at a set-point power factor under worst case conditions, power factor control capacitors 40 may be implemented with a total capacitance of 600 kVAR (i.e., 500 kVAR+20%).

According to one example, as illustrated by FIG. 3, power factor control capacitors 40 are implemented as number of power factor correction capacitor steps, CS (indicated as capacitor steps CS1 to CSn). In one example, each capacitor step, CS, includes a power factor correction capacitor bank, C, connected in series with a reactor, L, to form a shunt detuned harmonic filter (i.e., each power factor correction capacitor step, CS, comprises a shunt detuned harmonic filter). A shunt detuned harmonic filter provides power factor correction at the fundamental frequency and becomes an inductance at frequencies higher than its tuning point. Typically, such "detuned" filters are tuned to a frequency below the $5^{th}$ harmonic, where the filter provides an inductive impedance path to currents at harmonic frequencies created by nearly all 3-phse non-linear loads (e.g., $5^{th}$, $7^{th}$, $11^{th}$, $13^{th}$, etc.). Because the detuned filter is not capacitive at frequencies above the tuning point frequency, the power factor correction capacitors 40 cannot create a resonance on the electrical distribution system at such frequencies (e.g., with the inductance of power transformer 18) and, thus, cannot magnify such harmonic voltages and currents. In one example, each capacitor step, CS, is tuned to the $3.78^{th}$ harmonic so as to be tuned to a frequency where no harmonic energy is expected. In one example, as illustrated, each capacitor bank, C, is a delta-connected capacitor bank.

In one example, each capacitor step, CS, is electrically connected to a power bus 70 via a corresponding controllable contact CC and fused switch FS, with power bus 70 being connected to electrical power distribution 10 via a circuit breaker 72. In one example, the number and size of each capacitor step, CS, is based on the stability of the system load (as described above). For example, for a same amount of total capacitance, PQIS 30 may be configured with a larger number of smaller capacitor steps for an electrical power distribution system having a variable load, and with a fewer number of larger capacitor steps for an electrical distribution system having a stable load.

As an example, consider a scenario where two different electrical power distribution systems each require 600 kVAR of power factor correction capacitors 40, where the first electrical power distribution system is deemed to have a stable load, but the second electrical power distribution system is deemed to have a variable load. In one example, when implemented for use with the first electrical power distribution system, PQIS 30 may have power factor correction capacitors 40 configured as 6 steps (CS1 to CS6) of 100 kVAR each, and when implemented for use with the second electrical power distribution system, PQIS 30 may have power factor correction capacitors 40 configured as 12 capacitor steps (CS1 to CS12) of 50 kVAR each. As will be described in greater detail below, in examples, a switching time (or delay time) for switching individual capacitor steps, CS1 to CSn, into and out of electrical power distribution system 10 may also vary based on whether a system is deemed to have a stable or a variable load. For example, a switching time may be shorter for an electrical power distribution system having a variable system load as compared to a system having a stable load. Employing smaller capacitor steps and faster switching times enables PQIS 30 to more quickly and precisely regulate the system power factor at a set-point power factor for electrical power distribution systems having variable loads. Such delay time is implemented to ensure that a change in system power factor which triggers PQIS 30 to adjust an amount of capacitor steps connected to electrical power distribution system 10 is due to an actual change in load conditions and not a transient condition (e.g., a utility "brownout" condition).

In one example, as illustrated, the capacitors, C, of each capacitor step, CS1 to CSn, comprise a delta-connected capacitor bank and are not referenced to ground. In one example, each capacitor step, CS1 to CSn, includes pre-insertion resistor pack contacts (not illustrated) in parallel with the main controllable contact, CC, to reduce inrush current to 1.0 per unit (PU) such that zero-crossing switching is not required, and which further reduces a potential for back-to-back ringing between capacitor banks which can destroy capacitors due to overvoltage.

In one example, the capacitors of capacitor steps CS1 to CSn comply with IEEE Standard 18 (for Shunt Power Capacitors) where capacitors must withstand a maximum continuous RMS overvoltage of 110% (1.1 PU) and an overcurrent of 180% (1.8 PU) of nameplate ratings. In examples, the capacitors are dry-type, polypropylene, self-healing industrial grade capacitors with metalized coatings which are rated to 160% of nominal current, and rated for 20 million operations which, in one example, represents approximately 20 years of normal switching operations.

In one example, harmonic filters 50 may be configured as either a number of passive tuned harmonic filters 52 or as an active harmonic filter 54. In examples, similar to that of power factor correction capacitors 40, the type and number of harmonic filters 50 with which PQIS 30 is configured for a given electrical power distribution system is based on the system's load profile. In some cases, harmonic filters 50 may not be necessary. As described above, non-linear loads, such as adjustable speed drives, power supplies, and other devices that use-solid state switching, introduce harmonics into a power system (e.g., $5^{th}$, $7^{th}$, $11^{th}$, $13^{th}$, etc.).

In one example, if the load profile indicates that harmonic currents on electrical power distribution system 10 are relatively consistent and occur at a relatively limited number of harmonic frequencies, harmonic filters 50 of PQIS 30 may be implemented as a number of discrete passive tuned harmonic filters, indicated as passive tuned harmonic filters 52-1, 52-2 . . . 52-n, with each tuned to a specific harmonic frequency (e.g., $5^{th}$, $7^{th}$, etc.). Passive tuned harmonic filters are tuned to a specific harmonic frequency and act as a low-impedance path which absorbs and dissipates the specific harmonic current from the distribution as heat.

In other examples, if the load profile indicates that a large number of harmonic currents are present on the electrical power distribution system 10, or are inconsistent over time, both in magnitude and frequency, PQIS 30 may be implemented with active harmonic filter 54. An active harmonic filter monitors harmonic currents at selected harmonic frequencies and, rather than absorbing harmonic currents as is done by passive filters, generates a response current waveform that is opposite to the harmonic current waveform, thereby cancelling the harmonic current from the system.

In one example, as illustrated, PQIS 30 includes PQ node 56 which provides real-time power quality monitoring of electrical distribution system 10. In examples, PQ node 56 monitors, detects, and records any number of power disturbances at both primary and secondary voltages (i.e., both the primary and secondary sides of a transformer, such service transformer 18) such as incipient faults, voltage spikes, harmonic emissions, primary and secondary voltage sages, primary and secondary current spikes, phase imbalance, secondary circuit breaker trips, and reactance to faults and partial discharges, to name a few. In examples, PQ node 56 also provides revenue-grade energy metering and records environmental data such as temperature, humidity, barometric pressure, and vibration, among others.

Figure 4:
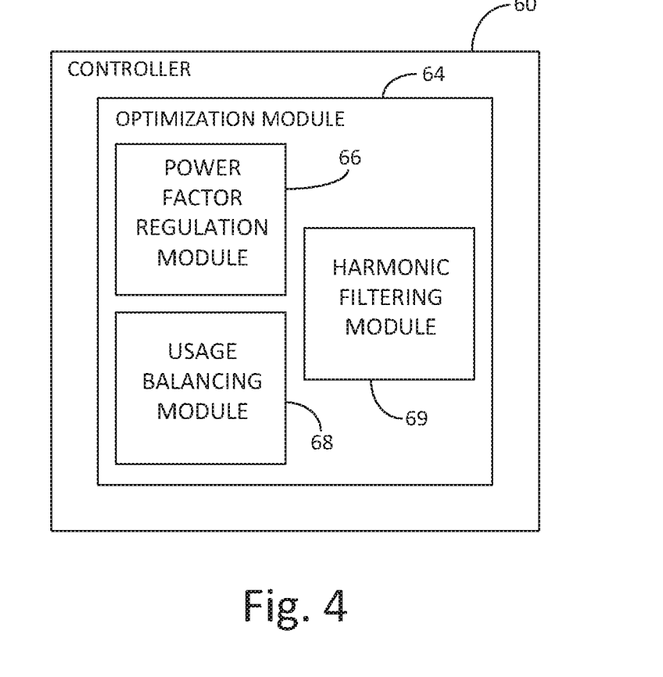
FIG. 4 is a block and schematic diagram generally illustrating a controller for use with a power quality improvement system, according to one example.

FIG. 4 is a block and schematic diagram generally illustrating controller 30, according to one example, where controller 30 includes optimization module 64. In one example, optimization module 64 includes a power factor regulation module 66, a capacitor usage balancing module 68, and a harmonic filtering module 69.

Figure 5:
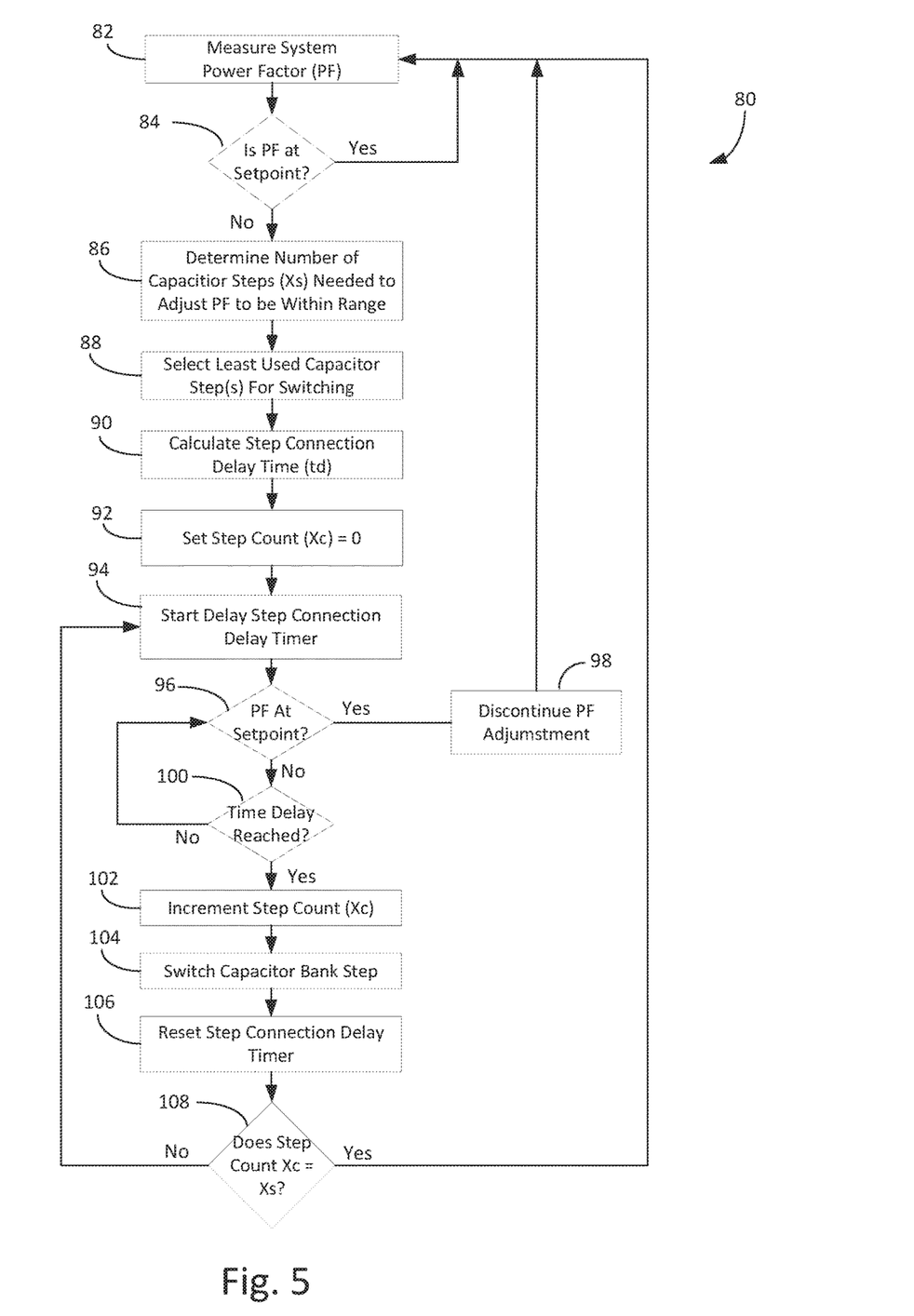
FIG. 5 is a flow diagram generally illustrating operation of a power quality improvement system, according to one example.

FIG. 5 is a flow diagram 80 generally illustrating and describing an example operation of PQIS 30, according to one case, with further reference to FIGS. 2-4. The operating begins at 82, where parameter measurement module 62 measures various operating parameters of electrical power distribution system 10 based on voltage and current signals 25 and 26, where such parameters include real power (kW), reactive power (kVAR), and power factor (PF). At 84, based on the measured power factor provided by parameter measurement module 62 at 82, power factor regulation module 66 queries whether the measured PF is at the set-point power factor. In one case, the set-point power factor may be selected set-point power factor, such as 0.98, for example. In other cases, the set-point power factor may be selected to be a power factor range, such as 0.96 to 0.98, for example. If the answer to the query at 84 is "yes", meaning that the current PF of electrical distribution system 10 is at the set-point power factor level, flow 80 returns to 82, where the system PF is again measured. If the answer to the query at 84 is "no", meaning the current PF of electrical distribution system 10 is not at the set-point power factor level, flow 80 proceeds to 86.

At 86, based on the real power (kW), reactive power (kVAR), and power factor (PF) as measured by parameter measurement module 62 at 82, power factor regulation module 66 determines an amount of kVAR required to adjust the system power factor to the set-point power factor, and determines a number of power factor correction steps, CS, needed to provide such PF adjustment. If the present system power factor is greater than the set-point power factor, power factor regulation module 66 determines how many power factor correction steps, CS, are needed to be removed/disconnected from electrical power distribution system 10 to adjust the power factor to the set-point power factor. Likewise, if the present system power factor is less than the set-point power factor, power factor regulation module 66 determines how many power factor correction steps, CS, are needed to be added/connected to electrical power distribution system 10 to adjust the power factor to the set-point power factor.

As described above, in some examples, each power factor correction step, CS1 to CSn, is of a same size (e.g., 12 steps at 50 kVAR each for a total of 600 kVAR). In other examples, power factor corrects steps, CS1 to CSn, may be of different sizes (e.g., 4 steps at 25 kVAR, 3 steps at 50 kVAR, 2 steps at 75 kVAR, and 2 steps at 100 kVAR for a total of 600 kVAR). As an example to illustrate the operation of PQIS 30, consider a scenario where power factor correction capacitors 40 include 12 capacitor factor correction steps, CS1 to CS12, with each step being 50 kVAR for a total of capacitance of 600 kVAR, and the set-point power factor is 0.98. If parameter measurement module 62 indicates that present loads on electrical power distribution system 10 are 750 kW and 312 kVAR (812 kVA) with a power factor of 0.92, power factor regulation module 64 determines at 86 that 160 kVAR of capacitance must be added/connected to electrical power distribution system 10 to adjust the system power factor to the set-point power factor of 0.98.

Continuing with the illustrative example, to determine the number of capacitor steps, CS, required, power factor regulation module 64 divides 160 kVAR by 50 kVAR (the kVAR value of each step) and determines that 3.2 capacitor steps, CS, must be added/connected to power distribution system 10. In one example, power factor regulation module 64 will connect a capacitor step, CS, only if 60% or more of the kVAR of the step is required to correct the power factor (in other examples, values other than 60% may be used). According to the illustrated example, since only 20% of a fourth capacitor step, CS, is required, power factor regulation module 64 determines that 3 capacitor steps, CS, are required to be added/connected to electrical power distribution system 10 to adjust the system power factor to the set-point power factor. Upon determining the number of steps required, power factor regulation module 64 sets a capacitor step variable, Xs, to the number of capacitor steps needed. For the illustrative example, power factor regulation module 64 sets Xs equal to three (Xs=3).

After determining the number of power factor correction steps required to adjust the system power factor to the set-point power factor, flow 80 proceeds to 88, where power factor regulation module 64 selects which available power factor correction capacitor steps, CS1 to CSn, to add/connect to electrical power distribution system 10. In one example, power factor regulation module 64 selects from the available power factor correction steps, CS, those steps that have the least amount of usage and adds/connects the selected capacitor steps in order from least used to most used.

In one example, usage balancing module 68 tracks a number of usage factors, such as the number of times each capacitor step, CS, has been switched online (i.e., an operation count), and a total duration that each capacitor step, CS, has been online, for example. When connecting or disconnecting capacitor steps from electrical power distribution system 10 to adjust/regulate the system power factor, based on the maintained/logged usage factors for each power factor correction step, CS, usage balancing module 68 indicates an order in which remaining capacitor steps (i.e., those capacitor steps which are currently offline) should be added/connected by power factor regulation module 66 (e.g., in order from least used to most used). Similarly, when disconnecting capacitor steps from electrical power distribution system 10 to adjust/regulate the system power factor, based on the maintained/logged usage factors for each power factor correction step, CS, usage balancing module 68 indicates an order in which those capacitor steps currently connected to electrical power distribution system 10 should be removed/disconnected therefrom by power factor regulation module 66 (e.g., in order from most used to least used). In examples, usage balancing module 68 maintains a usage order list indicating the connection order of remaining capacitor steps, and a usage order list indicating the disconnection order of capacitor steps presently connected to electrical power distribution system 10. In this fashion, usage balancing module 68 balances the use between each of the power factor correction capacitor steps, CS1 to CSn, to avoid certain capacitor steps from being overused and to extend the operating lifetime of capacitor steps, CS, and thus the operating lifetime of PQIS 30.

After determining which capacitor steps, CS, to employ for switching, flow 80 proceeds to 90, where power factor regulation module 64 determines a step connect delay time (td). As described above, in examples, the delay time, td, is based on the load stability factor assigned to electrical power distribution system 10 as determined from the load profile. In examples, as described above, the more stable the load, the higher the load stability factor. In one example, the load stability factor is in units of seconds, with the step connect delay time, td, being equal to the load stability factor divided by the number of capacitor steps, Xs (td=load stability factor/Xs). In one example, the load stability factor may be selected from a range of time values (e.g., 10 to 1000 seconds). In one example, the load stability factor is 60 seconds, for example. Continuing with the above illustrative example, if the load stability factor is 60 seconds, and the number of capacitor steps, Xs, needed to adjust the pf to the set-point power factor is three (Xs=3), the delay time before switching in each of the three capacitor steps is equal to 20 seconds (td=60 s/3=20 seconds).

After determining the step delay time, td, flow 80 proceeds to switching (adding/removing) capacitor steps to/from electrical power distribution system 10. At 92, power factor regulation module 66 sets a step count variable, Xc, to zero (Xc=0). At 94, after setting step count variable, Xc, power factor regulation module 66 initiates a step delay timer which begins counting down from the step delay (e.g., from 20 seconds for the illustrative example).

Flow 80 then proceeds to proceeds to 96 where power factor regulation module 66 retrieves an up-to-date pf measurement from parameter measurement module 62 and queries whether the present system power factor on electrical power distribution system 10 is at the set-point power factor. If the answer to the query at 96 is "yes", flow 80 proceeds to 98 where power factor regulation module 66 discontinues the present power factor adjustment procedure and returns to 82. As described above, such a scenario may occur when the determined power factor correction procedure was triggered by a transient condition on electrical power distribution system 10 (e.g., a utility brownout condition).

If the answer to the query at 96 is "no", the system power factor remains at a value other than the set-point power factor, and flow 80 proceeds to 100. As 100, power factor regulation module 66 queries whether the delay time, td, has been reached (e.g., has the delay timer reached zero). If the answer to the query at "100" is "no", the delay time, td, has not been reached, and flow 80 returns to 96 to continue the delay time countdown.

If the answer to the query at 100 is "yes", the delay time has been reached and power factor correction module 66 proceeds to 102 where the step count variable, Xc, in incremented by one. For example, if Xc had been at a value of "0", Xc is incremented by one so that Xc is now equal to one (e.g., Xc=1). Flow 80 then proceeds to 104, where power factor regulation module 66 switches in the capacitor step, CS, corresponding to the step count variable, Xc (i.e., the remaining capacitor step, CS, having the least amount of usage as determined by usage balancing module 68, such as via the usage order lists). In one example, power factor regulation module 66 switches in the capacitor step, CS, via the corresponding controllable contact, CC (see FIG. 3).

Flow 80 then proceeds to 106 where power factor regulation module 66 resets the step delay timer to the current value delay time value, td. Flow 80 then proceeds to 108, where power factor regulation module 66 queries whether the step count Xc is equal to the number of capacitor steps Xs for the present power factor correction procedure (Xc=Xs). If the answer to the query at 108 is "no", there are remaining capacitor steps, CS, to switch onto electrical power distribution system 10 as part of the present power factor correction procedure, and flow 80 returns to 94 to initiate switching of the next capacitor step. If the answer to the query at 108 is "yes", all capacitor steps, CS, of the present power factor correction procedure have been switched onto electrical power distribution system 10, and flow 80 returns to 82 to resume regulating the system power factor.

In examples, usage balancing module 68 monitors each of the capacitor steps, CS, when they are connected to electrical power distribution system to track their usage time. Additionally, in examples, usage balancing module 68 monitors the operating temperature of each of the capacitor steps, CS, when they are connected to electrical power distribution system. If, while connected to electrical power distribution system 10, usage balancing module 68 determines that a capacitor step, CS, has reached a maximum time duration for connection to electrical power distribution system 10, or has reached a maximum allowed operating temperature, usage balancing module 68 instructs power factor regulation module 66 to disconnect the capacitor step from the distribution system and replace it with the least used capacitor step available (such as via the usage order list). In this way, usage balancing module 68 balances the usage between power factor correction step, CS, and extends the operational life of each power factor correction capacitor step, CS, and, thus, extends the operation life of PQIS 30.

In examples, harmonic filtering module 69 monitors the operation of harmonic filters 50. In the case of passive tuned harmonic filters 52, in examples, harmonic filtering module 69 monitors a temperature and a level of current flow through each passive tuned filter, 52-1 to 52-n. If a temperature of a passive tuned harmonic filter 52 exceeds a maximum allowable temperature, in examples, harmonic filter module 69 may disconnect the harmonic filter from electrical power distribution system 10, or connect another stage of such harmonic filter to replace the stage which is overheating. In other examples. If the current through a passive tuned harmonic filter 69 is approaching a maximum allowed value, in examples, harmonic filter module 69 may switch-in a second stage of the harmonic filter to provide more capacity. Additionally, harmonic filtering module 69, in some examples, monitors the status of harmonic filters 50 (e.g., operation status—connected/disconnected).

Figure 6:
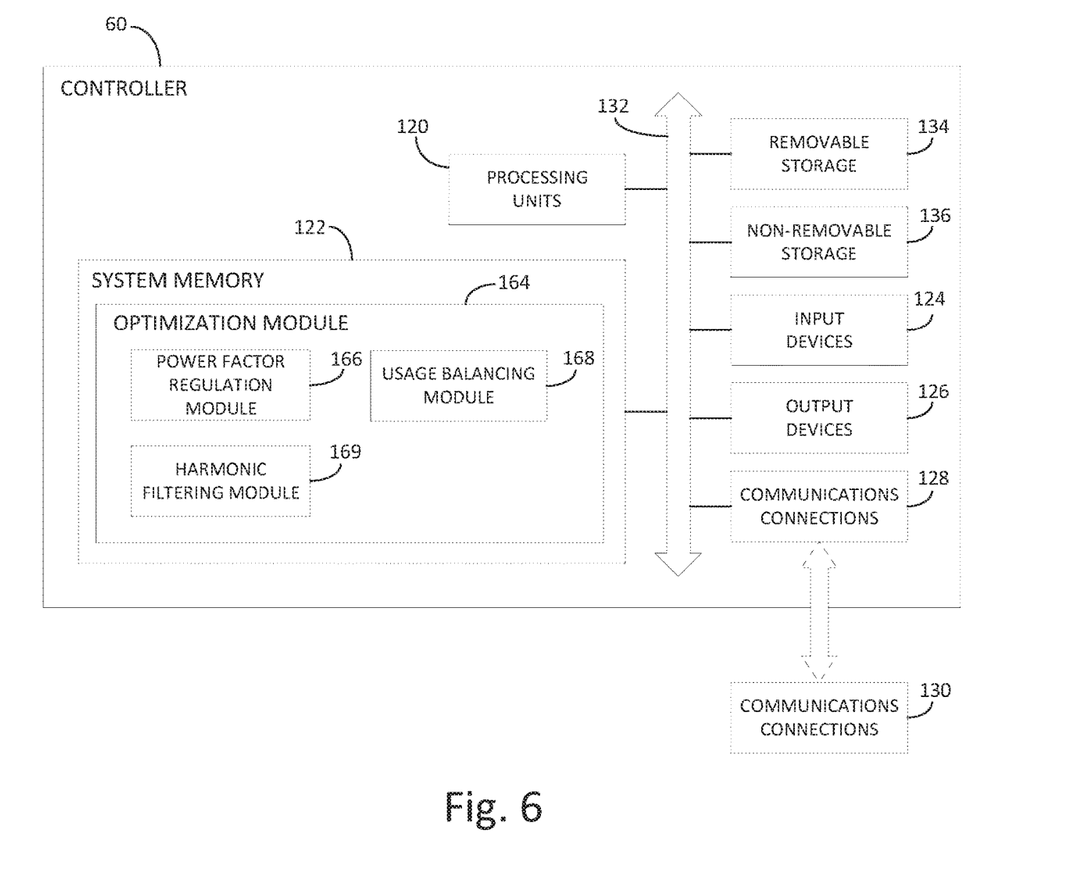
FIG. 6 is a block and schematic diagram generally illustrating a controller for use with a power quality improvement system, according to one example.

FIG. 6 is a block and schematic diagram generally illustrating an example of controller 60 implemented as a computing system including any combination of hardware and programming to implement the functionalities of optimization module 64, including power factor regulation module 66, usage balancing module 68, and harmonic filtering module 69, as described by the present disclosure. For example, optimization module 64, including power factor regulation module 66, usage balancing module 68, and harmonic filtering module 69, may be implemented as processor executable instructions stored on at least one non-transitory machine-readable storage medium and hardware may include at least one processing resource to execute the instructions. According to such examples, the at least one non-transitory machine-readable storage medium stores instructions that, when executed by the at least one processing resource, carryout the functionality of optimization module 64, including power factor regulation module 66, usage balancing module 68, and harmonic filtering module 69

In one example, as illustrated, controller 60 includes processing units 120 and system memory 122, where system memory 122 may be volatile (e.g. RAM), non-volatile (e.g. ROM, flash memory, etc.), or some combination thereof. Controller 60 may also have additional features/functionality and additional or different hardware. For example, controller 60 may include input devices 124 (e.g. keypad, Bluetooth, etc.), output devices 126 (e.g. display), and communication connections 128 that enable controller 60 to communicate with remote devices 130 (e.g., other computers/applications), wherein the various elements of controller 60 are communicatively coupled to one another via communication links 132.

In one example, controller 60 may include additional storage (removable and/or non-removable) including, but not limited to, magnetic or optical disks or tape. Such additional storage is illustrated in FIG. 6 as removable storage 134 and non-removable storage 136. Computer storage media includes volatile and nonvolatile, removable and non-removable media implemented in any suitable method or technology for non-transitory storage of information such as computer readable instructions, data structures, program modules, or other data, and does not include transitory storage media. Computer storage media includes RAM, ROM, EEPROM, flash memory or other memory technology, CD-ROM, digital versatile disks (DVD) or other optical storage, magnetic cassettes, magnetic tape, and magnetic disc storage or other magnetic storage devices, for example.

System memory 122, removable storage 134, and non-removable storage 136 represent examples of computer storage media, including non-transitory computer readable storage media, storing computer executable instructions that when executed by one or more processors units of processing units 120 causes the one or more processors to perform the functionality of a system, such as optimization module 64. For example, system memory 122 stores computer executable instructions 162 for computer executable instructions 164 for optimization module 64, including computer executable instructions 166 for power factor regulation module 66, computer executable instructions 168 for usage balancing module 68, and computer executable instructions 169 for harmonic filtering module 69, that when executed by one or more processing units of processing units 120 implement the functionalities of optimization module 64, including power factor regulation module 66, usage balancing module 68, and harmonic filtering module 69 of power quality improvement system 30, as described herein. In one example, one or more of the at least one machine-readable medium storing instructions for optimization module 64, including power factor regulation module 66, usage balancing module 68, and harmonic filtering module 69 may be separate from but accessible to controller 60. In other examples, hardware and programming may be divided among multiple computing devices.

In some examples, the computer executable instructions can be part of an installation package that, when installed, can be executed by at least one processing unit to implement the functionality of optimization module 64, including power factor regulation module 66, usage balancing module 68, and harmonic filtering module 69. In such examples, the machine-readable storage medium may be a portable medium, such as a CD, DVD, or flash drive, for example, or a memory maintained by a server from which the installation package can be downloaded and installed. In other examples, the computer executable instructions may be part of an application, applications, or a component already installed in controller 60, including the processing resource. In such examples, the machine readable storage medium may include memory such as a hard drive, solid state drive, or the like. In other examples, the functionalities of at least one of parameter measurement module 62 and optimization module 64, including power factor regulation module 66, usage balancing module 68, and harmonic filtering module 69 may be implemented in the form of electronic circuitry.

By integrating and implementing power factor correction capacitors 40 and harmonic filters 70 based on a same load profile (derived from extended metering), into power quality improvement system (PQIS) 30, in accordance with the present disclosure, power factor correction capacitors 40 and harmonic filters 50 work in conjunction with one another to provide automatic power factor correction and to remove damaging harmonic currents from a corresponding electrical power distribution system to which the system is connected. Additionally, by balancing usage of each of the power factor correction steps, and by building additionally power factor correction capacitance into the system (e.g., 20% extra), the operation life of PQIS 30 is extended.

Although specific embodiments have been illustrated and described herein, it will be appreciated by those of ordinary skill in the art that a variety of alternate and/or equivalent implementations may be substituted for the specific embodiments shown and described herein without departing from the scope of the present invention. This application is intended to cover any adaptations or variations of the specific embodiments discussed herein. Therefore, it is intended that this invention be limited only by the claims and the equivalents thereof.

What is claimed is:

1. A power quality improvement system for an electrical power distribution system, comprising:

a parameter measurement module to provide real time measurements of a power factor of the electrical power distribution system;

a number of capacitor steps selectively connectable to the electrical power distribution system, wherein each of the capacitor steps is detuned from a harmonic frequency;

a number of harmonic filters connected to the electrical power distribution system, wherein each of the number of harmonic filters is tuned to a different harmonic frequency, wherein a type of the harmonic filters is based on a load profile of the electrical power distribution system, and a number and size of each capacitor step is based on a load stability factor, the load stability factor based on the load profile, wherein the load profile represents characteristics over time of values of a number of parameters of the electrical load of the electrical power distribution system, and the load stability factor is indicative of the variability of the parameter values over time; and a controller to:

monitor a status of the harmonic filters; and automatically connect or disconnect a number of selected capacitor steps from the electrical power distribution system to maintain the measured power factor at a set-point power factor, wherein a switching time delay before connecting or disconnecting each selected capacitor step is based on the load stability factor of the electrical power distribution system.

2. The power quality improvement system of claim 1, where each capacitor step is the same size.

3. The power quality improvement system of claim 1, wherein the number of capacitor steps is based on the load stability factor.

4. The power quality improvement system of claim 1, wherein the switching time delay is based on the load stability factor.

5. The power quality improvement system of claim 1, the controller to balance a usage of each capacitor step based on a plurality of usage factors.

6. The power quality improvement system of claim 1, wherein the plurality of factors includes a number of times each capacitor step has been connected and a total time duration each capacitor step has been connected to the electrical power distribution system.

7. The power quality improvement system of claim 1, wherein the load profile is based on electrical parameter measurements of the electrical power distribution system over a time period.

8. The power quality improvement system of claim 1, wherein the type of harmonic filters includes one of passive tuned harmonic filters and active harmonic filters.

9. The power quality improvement system of claim 1, further including a power quality node to provide real-time power quality monitoring of the electrical power distribution system.

10. The power quality improvement system of claim 1, wherein the switching time is equal to the load stability factor divided by the number of capacitor steps to be switched during the power factor correction operation.

11. The power quality improvement system of claim 1, the parameters of the electrical load including one or more of voltage, current, kilowatts, kilovolt amperes reactive, kilovolt amperes, and harmonic currents.

12. A controller for controlling a power quality improvement system including a number of capacitor steps selectively connectable to an electrical power distribution system comprising:
   a usage balancing module to provide a usage order list of available capacitor steps based on a plurality of usage factors so as to balance a usage of each capacitor step, the usage based on a plurality of usage factors; and
   a power factor regulation module to:
      receive real time power factor measurements of the electrical power distribution system; and
      automatically connect or disconnect a number of selected capacitor steps from the electrical power distribution during a power factor correction operation to maintain the power factor at a set-point power factors, the number of selected capacitor steps connected or disconnected from the electrical power distribution system in an order based on the usage order list;
      wherein the controller waits for a switching time delay to expire before connecting or disconnecting each selected capacitor step, wherein the switching delay time is based on a load stability factor of the electrical power distribution system; and
      wherein the switching delay time is equal to the load stability factor divided by the number of capacitor steps to be switched during the power factor correction operation.

13. The controller of claim 12, wherein the load stability factor is based on a load profile of the electrical power distribution system.

14. The controller of claim 12, wherein the switching delay time is inversely proportional to a number of capacitor steps to be switched during the power factor correction operation.

15. The controller of claim 12, wherein the power factor regulation module discontinues the power factor correction operation if the power factor is at the set-point power factor during the switching delay time.

16. A power quality improvement system for an electrical power distribution system, comprising:
   a parameter measurement module to provide real time measurements of a power factor of the electrical power distribution system;
   a number of capacitor steps selectively connectable to the electrical power distribution system, wherein a number and size of each capacitor step are based on a load profile of the electrical power distribution system; and
   a controller to automatically connect or disconnect a number of selected capacitor steps from the electrical power distribution system to maintain the measured power factor at a set-point power factor, wherein a switching time delay before connecting or disconnecting each selected capacitor step is equal to a load stability factor divided by the number of capacitor steps to be switched during the power factor correction operation, wherein the load stability factor is based on the load profile, wherein the load profile represents characteristics over time of values of a number of parameters of the electrical load of the electrical power distribution system, and the load stability factor is indicative of the variability of the parameter values over time.

17. The power quality improvement system of claim 16, a number of harmonic filters connected to the electrical power distribution system, wherein a number and type of harmonic filters are based on the load profile of the electrical power distribution system.

18. The power quality improvement system of claim 17, wherein the number of capacitor steps are detuned from a harmonic frequency and each of the number of harmonic filters are tuned to a different one of a number of harmonic frequencies.

19. The power quality improvement system of claim 17, wherein the number of capacitor steps are detuned from a harmonic frequency and the number of harmonic filters comprises an active harmonic filter.

* * * * *